United States Patent
Röttger et al.

(10) Patent No.: US 7,414,870 B2
(45) Date of Patent: Aug. 19, 2008

(54) INVERTER

(75) Inventors: Dieter Röttger, Fröndenberg (DE); Thomas Vogel, Menden (DE)

(73) Assignee: Kostal Industrie Elektrik GmbH, Ludenscheid (DE)

( * ) Notice: Subject to any disclaimer, the term of this patent is extended or adjusted under 35 U.S.C. 154(b) by 23 days.

(21) Appl. No.: 11/804,074

(22) Filed: May 17, 2007

(65) Prior Publication Data

US 2007/0217239 A1  Sep. 20, 2007

Related U.S. Application Data

(63) Continuation of application No. PCT/EP2006/001736, filed on Feb. 24, 2006.

(30) Foreign Application Priority Data

Feb. 26, 2005 (DE) .................. 10 2005 008 809

(51) Int. Cl.
- *H02M 7/5387* (2007.01)
- *H02M 7/537* (2006.01)
- *H02M 5/45* (2006.01)

(52) U.S. Cl. .............................. 363/98; 363/35; 363/36

(58) Field of Classification Search .................. 363/95, 363/97, 98, 131, 132, 34, 35, 36

See application file for complete search history.

(56) References Cited

U.S. PATENT DOCUMENTS

| 6,154,379 | A | 11/2000 | Okita |
| 7,130,205 | B2 * | 10/2006 | Peng ........................... 363/140 |
| 7,269,036 | B2 * | 9/2007 | Deng et al. .................... 363/49 |
| 2003/0164695 | A1 | 9/2003 | Fasshauer et al. |
| 2004/0156408 | A1 | 8/2004 | West et al. |

FOREIGN PATENT DOCUMENTS

| DE | 199 37 410 A1 | 2/2001 |
| WO | WO 2004/100348 A1 | 11/2004 |

* cited by examiner

*Primary Examiner*—Gary L Laxton
(74) *Attorney, Agent, or Firm*—Brooks Kushman P.C.

(57) ABSTRACT

An inverter includes an intermediate circuit, inverter bridge branches downstream of the intermediate circuit for outputting a power signal, and a controller operable for individually turning on and off the inverter bridge branches. The controller may individually turn on and off the inverter bridge branches as a function of an electrical quantity. The electrical quantity may be indicative of a voltage or a change in voltage occurring in the intermediate circuit during operation of the inverter. The electrical quantity may be indicative of the output power signal. The inverter bridge branches may include three inverter bridge branches.

11 Claims, 1 Drawing Sheet

INVERTER

CROSS-REFERENCE TO RELATED APPLICATIONS

This is a continuation of International Application PCT/EP2006/001736, published in German, with an international filing date of Feb. 24, 2006, which claims priority to DE 10 2005 008 809.0, filed Feb. 26, 2005, the disclosures of which are both hereby incorporated by reference.

BACKGROUND OF THE INVENTION

1. Field of the Invention

The present invention relates to an electrical inverter having an intermediate circuit and a plurality of inverter bridge branches.

2. Background Art

An inverter has one, two, or three inverter bridge branches on its output side to correspondingly produce an output voltage having one, two, or three phases. A typical inverter switches on as an entire unit. As a result, a problem with the typical inverter is that the inverter immediately has full intrinsic consumption.

DE 199 37 410 A1 describes an inverter having three inverter bridge branches on its output side to produce a three-phase current. A problem is that this three-phase inverter has a lower efficiency in low load operation than a single-phase inverter or a two-phase inverter.

The efficiency of an inverter, especially a photovoltaic inverter, for low load operation substantially contributes to the overall efficiency of the inverter.

SUMMARY OF THE INVENTION

Accordingly, an object of the present invention includes a multi-phase inverter having a high efficiency in low load operation.

Another object of the present invention includes a multi-phase inverter having an intermediate circuit and a plurality of inverter bridge branches in which the inverter bridge branches can be individually turned on and off.

A further object of the present invention includes a multi-phase inverter having an intermediate circuit and a plurality of inverter bridge branches in which the inverter bridge branches are individually turned on and off as a function of the load operation of the inverter.

Another object of the present invention includes a multi-phase inverter having an intermediate circuit and a plurality of inverter bridge branches in which the inverter bridge branches are individually turned on and off in response to voltage fluctuations which occur in the intermediate circuit as a function of the load operation of the inverter.

In carrying out the above object and other objects, the present invention provides an inverter. The inverter includes an intermediate circuit, inverter bridge branches (such as three inverter bridge branches) downstream of the intermediate circuit for outputting a power signal, and a controller operable for individually turning on and off the inverter bridge branches.

The controller may individually turn on and off the inverter bridge branches as a function of an electrical quantity. The electrical quantity may be indicative of a voltage occurring in the intermediate circuit during operation of the inverter. The electrical quantity may be indicative of a change in voltage occurring in the intermediate circuit during operation of the inverter. In this case, the electrical quantity may be indicative of a maximum value of the voltage change occurring in the intermediate circuit during operation of the inverter. The electrical quantity may be indicative of the output power signal.

The inverter may further include a converter upstream of the intermediate circuit. In this case, the electrical quantity may be indicative of power fed into the converter. The inverter may further include an analog-to-digital converter to monitor the electrical quantity. The controller may include a microcontroller.

Each inverter bridge branch may be a controllable half bridge. The inverter may be part of a photovoltaic system. The output power signal may feed into a public power network.

Further, in carrying out the above object and other objects, the present invention provides another inverter. This inverter includes a converter, three inverter bridges, and a controller. The converter has an input side for receiving an input power signal from photovoltaic elements and an output side for outputting a converted output power signal based on the input power signal. The three inverter bridges are connected in parallel to the output side of the converter and connected in parallel to one another. Each inverter bridge has an on state and an off state. The inverter bridges output at least one of a one-phase, two-phase, and three-phase inverter power signal based on the converted output power signal depending on which of the inverter bridges are in the on state and which of the inverter bridges are in the off state. The controller is operable for individually switching the inverter bridges between their on and off states. The controller switches one inverter bridge to the on state and switches the remaining inverter bridges to the off state when the power of the inverter power signal falls in a relatively low power range. The controller switches two inverter bridges to the on state and switches the remaining inverter bridge to the off state when the power of the inverter power signal falls in a relatively medium power range. The controller switches on all of the inverter bridges when the power of the inverter power signal falls in a relatively high power range.

The inverter may further include a capacitor arrangement connected in parallel to the output side of the converter upstream of the inverter bridges and connected in parallel to the inverter bridges. Voltage fluctuations occur in the capacitor arrangement depending upon the power of the inverter power signal. The controller individually switches the inverter bridges between their on and off states as a function of the voltage fluctuations occurring in the capacitor arrangement.

A goal of a multi-phase inverter in accordance with embodiments of the present invention is to have reduced intrinsic consumption especially during low load operation (i.e., the partial-load range). This goal is accomplished by connecting the inverter bridge branches one at a time as a function of the load operation of the inverter. For instance, with a three-phase inverter having three inverter bridge branches, the first inverter bridge branch (i.e., one phase) is connected under relatively low loads while the second and third inverter bridge branches being disconnected, then the second inverter bridge branch along with the first inverter bridge branch (i.e., two phase) are connected under relatively medium loads with the third inverter bridge branch being disconnected, and then the third inverter bridge branch along with the first and second inverter bridge branches (i.e., three phase) are connected under relatively high loads. Likewise, the first, second,. and third inverter bridge branches (i.e., three phase) are connected under relatively high loads, then only the first and second inverter bridge branches (i.e., two phase) are connected under relatively medium loads with the third inverter bridge branch being disconnected, and then only the first inverter bridge branch (i.e., one phase) is connected under relatively low loads with the second and third inverter bridge branches being disconnected.

A single-phase inverter does not have this capability as this inverter only has one inverter bridge branch. The background art is void a three-phase inverter that functions in this way.

A multi-phase inverter in accordance with embodiments of the present invention includes an intermediate circuit and a plurality of inverter bridge branches. The intermediate circuit is upstream of the inverter bridge branches. The intermediate circuit includes capacitor circuitry for storing or buffering energy. A result is voltage fluctuations ("ripples") occurring in the intermediate circuit. The voltage ripples increase (decrease) with higher (lower) output power of the inverter. In an embodiment of the present invention, the voltage ripples or the change in the voltage ripples in the intermediate circuit are evaluated. The appearance of the voltage ripples in the intermediate circuit are used as a criterion for introducing multi-phase or single-phase operation.

An advantage of demand-driven feeding from a three-phase inverter into a power network with a variable number of phases is that maximum power is shared between the three inverter bridge branches. As a result, each inverter bridge branch may be designed to handle a third of the maximum load. Thus, in a partial-load range in which only a fraction of the maximum power is transferred, one or two of the three inverter bridge branches are sufficient for the transferred power. The expense to provide this capability is relatively the same as that of a single-phase inverter in which the single inverter bridge branch itself is designed to handle the maximum load.

Accordingly, a three-phase inverter in accordance with embodiments of the present invention combines advantages of a three-phase inverter in accordance with the background art with advantages of either a single-phase inverter or a two-phase inverter. Namely, a three-phase inverter in accordance with embodiments of the present invention provides the possibility of multi-phase feeding into a power network during high load operation with high efficiency during low load operation. Thus, the overall efficiency of a photovoltaic system can be increased as compared to a single-phase inverter in the lower partial-load range and compared to a three-phase inverter in accordance with the background art.

In an embodiment of the present invention, an analog-to-digital converter (ADC) detects the voltage or voltage change occurring in the intermediate circuit. The ADC provides an output signal indicative of the voltage or voltage change occurring in the intermediate circuit to a controller. The controller is operable for individually controlling (e.g., turning on and off) the inverter bridge branches. The controller individually turns on and off the inverter bridge branches as a function of the voltage or voltage change occurring in the intermediate circuit.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
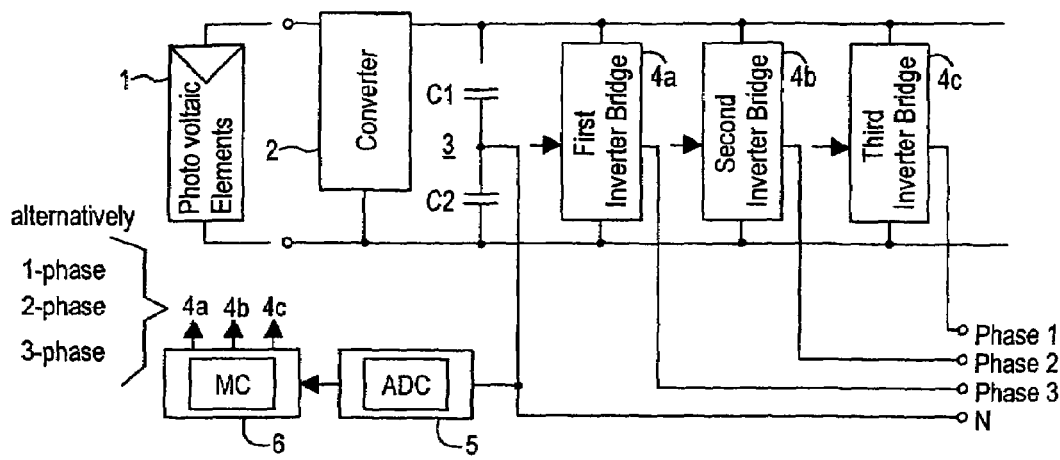
FIG. 1 illustrates a block diagram of a three-phase inverter in accordance with an embodiment of the present invention.

Referring now to FIG. 1, a block diagram of a three-phase inverter in accordance with an embodiment of the present invention is shown. The inverter includes an a direct voltage/direct voltage (DC/DC) converter 2, an intermediate circuit 3, and first, second, and third inverter bridge branches 4a, 4b, 4c.

The inverter feeds photovoltaic produced electrical energy from photovoltaic elements 1 into a three-phase power network. Photovoltaic elements 1 are connected to the input side of the inverter. Photovoltaic elements 1 provide a direct current (DC) voltage to DC/DC converter 2. DC/DC converter 2 adapts the input voltage to the voltage level required on the output side of the inverter.

Intermediate circuit 3 includes a capacitor arrangement downstream of DC/DC converter 2. The capacitor arrangement includes capacitors C1, C2. Capacitors C1, C2 are used to store or buffer energy. Inverter bridges 4a, 4b, 4c are downstream of the capacitor arrangement on the output side of the inverter. Each inverter bridge 4a, 4b, 4c is internally formed as a half-bridge arrangement. Each inverter bridge 4a, 4b, 4c includes two controllable semiconductor switches.

The inverter further includes a processor 5 and a controller 6 (e.g., a micro-controller (MC)). Processor 5 is in communication with controller 6. Processor 5 includes an analog-to-digital converter (ADC) for detecting and monitoring the voltage and/or the change in voltage occurring in intermediate circuit 3 during the operation of the inverter. The ADC of processor 5 provides a signal indicative of the voltage or change in voltage occurring in intermediate circuit 3 to controller 6. Controller 6 is operable for individually controlling (e.g., turning on and off) inverter bridge branches 4a, 4b, 4c. Controller 6 evaluates the signal from the ADC of processor 5 and individually turns on and off inverter bridge branches 4a, 4b, 4c as a function of the voltage or voltage change occurring in intermediate circuit 3.

The inverter can feed a three-phase alternating voltage through the three inverter bridges 4a, 4b, 4c into the power network. This presents a problem in that when the output of the inverter is under low load, the efficiency of the inverter is worse in its three-phase mode than an inverter having only one inverter bridge and operating in single-phase mode.

Figure 2:
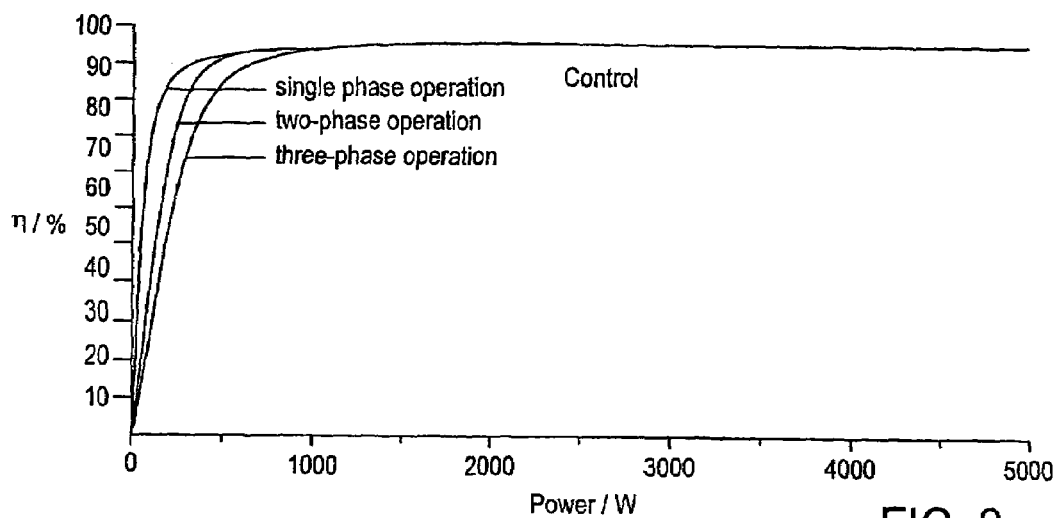
FIG. 2 illustrates a plot of the efficiency of an inverter during operation of the inverter in the single-phase mode, two-phase mode, and three-phase mode.

Referring now to FIG. 2, with continual reference to FIG. 1, a plot of the efficiency of the inverter during operation of the inverter in the single-phase mode, two-phase mode, and three-phase mode is shown. Third inverter bridge 4c is turned on and first and second inverter bridges 4a, 4b are turned off in the single-phase mode; second and third inverter bridges 4b, 4c are turned and first inverter bridge 4a is turned off in the two-phase mode; and first, second, and third inverter bridges 4a, 4b, 4c are turned on in the three-phase mode. The plot of FIG. 2 demonstrates that the efficiency of the inverter decreases along with the amount of power drawn from the inverter. The plot of FIG. 2 further demonstrates that the efficiency of the inverter while operating in the three-phase mode is lower than the efficiency of the inverter while operating in the single-phase mode for low loads.

As indicated in FIG. 2, the inverter has a total output of 5 kW. The inverter may operate in either the single-phase mode with one inverter bridge, the two-phase mode with two inverter bridges, or the three-phase mode with three inverter bridges. The efficiency of the inverter while operating in the three-phase mode starts to reduce at an output power of 1 kW to a lower output power. The efficiency of the inverter while operating in the two-phase mode or the single-phase mode remains approximately constant from the output power of 1 KW to a lower output power. The efficiency of the inverter while operating in the single-phase mode is higher than the efficiency of the inverter while operating in either the two-phase mode or the three-phase mode at an output power of up to 500 W.

To solve the problem of the efficiency of the inverter dropping while the inverter is in a multi-phase mode in response to the output power of the inverter dropping, controller 6 controls inverter bridges 4a, 4b, 4c to switch the inverter from the multi-phase mode to either a lower multi-phase mode or the single-phase mode. For instance, to solve the problem of the efficiency of the inverter dropping in response to the output power of the inverter dropping from a relatively high load to a relatively medium load (i.e., from an output power of 1 kW to an output power of 500 W) while the inverter is in the three-phase mode, controller 6 controls inverter bridge branches 4a, 4b, 4c to switch the inverter from the three-phase mode to the two-phase mode. Namely, controller 6 turns off first inverter bridge 4a while second and third inverter bridges 4b, 4c remain turned on. Likewise, to solve the problem of the efficiency of the inverter dropping in response to the output power of the inverter dropping from the relatively medium load to a relatively low load (i.e., from an output power of 1 kW to a lower output power), controller 6 controls inverter bridges 4a, 4b, 4c to switch the inverter from the two-phase mode to the single-phase mode. Namely, controller 6 turns off second inverter bridge 4b while first inverter bridge 4a remains turned off and third inverter bridge 4c remains turned on. As a result, favorable efficiency of the inverter is obtained in each load range. The switch-over in the partial-load range means that only a single or two-phase voltage will be fed into a three-phase network. However, this is not a problem as the power to be fed into the network is relatively small compared to the total power transported by the network.

The switch-over from a single-phase inverter to a multi-phase inverter takes place as follows. When there is higher power in the intermediate circuit and an inverter with a single-phase network feed is used, voltage fluctuations ("ripples") occur in the intermediate circuit. Relatively large capacitors are used for the intermediate circuit of a single-phase inverter having only one inverter bridge to avoid the formation of such ripples in the intermediate circuit. However, the three-phase inverter in accordance with embodiments of the present invention has intermediate circuit capacitors (C1, C2) that are relatively small compared to the capacitors of the intermediate circuit of the single-phase inverter because the total of the input power with the three-phase feed is the same at any point in time.

Thus, a single-phase feed with a three-phase inverter in accordance with embodiments of the present invention produces a ripple in intermediate circuit 3. If the single-phase feed has small power, then the voltage of this ripple is correspondingly small.

Figure 3:
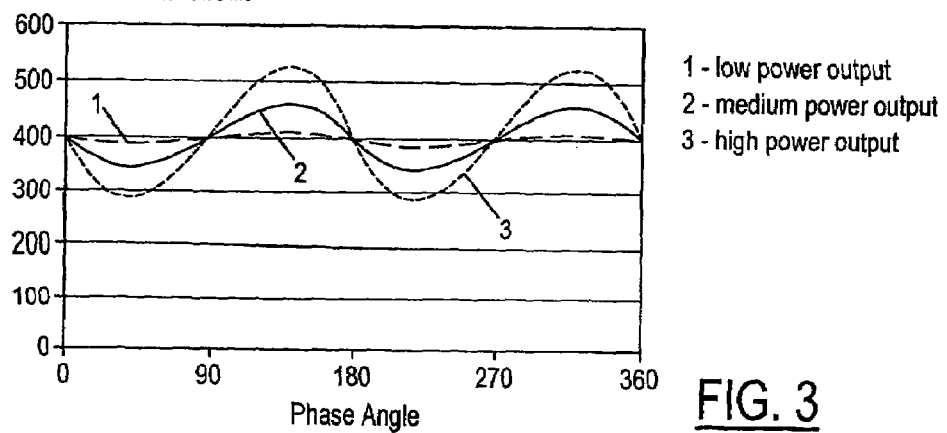
FIG. 3 illustrates a plot of the voltage ripples occurring in the intermediate circuit of a three-phase inverter in accordance with an embodiment of the present invention under different loads.

Referring now to FIG. 3, with continual reference to FIGS. 1 and 2, a plot of the voltage ripples occurring in intermediate circuit 3 of a three-phase inverter in accordance with an embodiment of the present invention under different power loads is shown. As shown, the voltage occurring in intermediate circuit 3 fluctuates slightly about a mean when the output power is small. In contrast, the voltage occurring in intermediate circuit 3 has a large amplitude at high output powers.

The problem of ripple formation occurring in intermediate circuit 3 during operation of the inverter can be eliminated by monitoring the voltage in intermediate circuit 3. This involves defining a maximum permissible voltage ripple. Processor 5 detects the voltage and the ripple that is occurring in intermediate circuit 3. Processor 5 provides a signal indicative of the ripple occurring in intermediate circuit 3 to controller 6. In turn, controller 6 switches other phases on or off depending upon the ripple occurring in intermediate circuit 3 by driving a corresponding number of inverter bridge branches 4a, 4b, 4c.

In this way, controller 6 can individually turn on and off inverter bridges 4a, 4b, 4c to switch the inverter from single-phase to two-phase and three-phase modes of operation in order to provide the highest efficiency for each power output load range (low, middle, high) of the inverter. That is, large ripples occur in intermediate circuit 3 when the inverter is outputting a large power output while the inverter is operating in the single-phase mode with only one inverter bridge being turned on. In response to the large ripples occurring in intermediate circuit 3, controller 6 turns on selected ones of the remaining inverter bridges to switch the inverter from the single-phase mode to either the two-phase mode or the three-phase mode.

Thus, a three-phase inverter in accordance with embodiments of the present invention takes advantage of the property of ripple formation in intermediate circuit 3, which was originally a disadvantage, in order to keep the ripple voltage levels small and at the same time to determine the most favorable point in time to switch over between single and multi-phase modes.

It is possible for other criteria to be used to turn the phases of the inverter on and off. For instance, the load on an individual phase can be used as a criterion to turn other phases on or off. Along with this, the load of the power semiconductor of inverter bridge branches 4a, 4b, 4c can be used as the criterion.

The arrangement of a photovoltaic inverter in accordance with embodiments of the present invention can substantially improve the overall efficiency of the inverter in partial-load ranges.

List of Reference Numbers

1 Photovoltaic elements
2 DC/DC converter
3 Intermediate circuit (capacitors)
4a First inverter bridge branch
4b Second inverter bridge branch
4c Third inverter bridge branch
5 Processor
6 Controller
ADC Analog-to-digital converter
C1, C2 Capacitors
MC Micro-controller While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:
1. An inverter comprising:
a converter having an input side for receiving an input power signal from photovoltaic elements and an output side for outputting a converted output power signal based on the input power signal;

three inverter bridges connected in parallel to the output side of the converter and connected in parallel to one another, each inverter bridge has an on state and an off state, wherein the inverter bridges output an inverter power signal based on the converted output power signal, wherein the inverter power signal is one of a one-phase, two-phase, and three-phase inverter power signal depending on which of the inverter bridges are in the on state and which of the inverter bridges are in the off state; and a controller operable for individually switching the inverter bridges between their on and off states, wherein the controller switches one inverter bridge to the on state and switches the remaining inverter bridges to the off state when the power of the inverter power signal falls in a relatively low power range, wherein the controller switches two inverter bridges to the on state and switches the remaining inverter bridge to the off state when the power of the inverter power signal falls in a relatively medium power range, wherein the controller switches on all of the inverter bridges when the power of the inverter power signal falls in a relatively high power range.

2. The inverter of claim 1 wherein:
the controller individually turns on and off the inverter bridges as a function of an electrical quantity.

3. The inverter of claim 2 wherein:
the electrical quantity is indicative of a voltage occurring in the intermediate circuit during operation of the inverter.

4. The inverter of claim 2 wherein:
the electrical quantity is indicative of a change in voltage occurring in the intermediate circuit during operation of the inverter.

5. The inverter of claim 4 wherein:
the electrical quantity is indicative of a maximum value of the voltage change occurring in the intermediate circuit during operation of the inverter.

6. The inverter of claim 1 wherein:
the controller includes a micro-controller.

7. The inverter of claim 1 further comprising:
a capacitor arrangement connected in parallel to the output side of the converter upstream of the inverter bridges and connected in parallel to the inverter bridges;
wherein voltage fluctuations occur in the capacitor arrangement depending upon the power of the inverter power signal;
wherein the controller individually switches the inverter bridges between their on and off states as a function of the voltage fluctuations occurring in the capacitor arrangement.

8. The inverter of claim 7 further comprising:
an analog-to-digital converter in communication with the capacitor arrangement for monitoring the voltage fluctuations occurring in the capacitor arrangement, the analog-to-digital converter being in communication with the controller for providing a signal indicative of the voltage fluctuations occurring in the capacitor arrangement to the controller.

9. The inverter of claim 1 wherein:
the controller individually switches the inverter bridges between their on and off states as a function of the power of the input power signal.

10. An inverter comprising:
a converter having an input side for receiving an input power signal and an output side for outputting a converted output power signal based on the input power signal;

three inverter bridges connected in parallel to the output side of the converter and connected in parallel to one another, each inverter bridge has an on state and an off state, wherein the inverter bridges output an inverter power signal based on the converted output power signal, wherein the inverter power signal is one of a one-phase, two-phase, and three-phase inverter power signal depending on which of the inverter bridges are in the on state and which of the inverter bridges are in the off state; and a controller operable for individually switching the inverter bridges between their on and off states, wherein the controller switches one inverter bridge to the on state and switches the remaining inverter bridges to the off state when the power of the inverter power signal falls in a relatively low power range, wherein the controller switches two inverter bridges to the on state and switches the remaining inverter bridge to the off state when the power of the inverter power signal falls in a relatively medium power range, wherein the controller switches on all of the inverter bridges when the power of the inverter power signal falls in a relatively high power range.

11. An inverter comprising:
a converter having an input side for receiving an input power signal and an output side for outputting a converted output power signal based on the input power signal;

three inverter bridges connected in parallel to the output side of the converter and connected in parallel to one another, each inverter bridge has an on state and an off state, wherein the inverter bridges output an inverter power signal based on the converted output power signal, wherein the inverter power signal is a one-phase inverter power signal when one of the inverter bridges is in the on state and the other inverter bridges are in the off state, wherein the inverter power signal is a two-phase inverter power signal when two of the inverter bridges are in the on state and the other inverter bridge is in the off state, wherein the inverter power signal is a three-phase inverter power signal when each of the inverter bridges are in the on state; and a controller operable for individually switching the inverter bridges between their on and off states, wherein the controller switches one inverter bridge to the on state and switches the remaining inverter bridges to the off state when the power of the inverter power signal falls in a relatively low power range, wherein the controller switches two inverter bridges to the on state and switches the remaining inverter bridge to the off state when the power of the inverter power signal falls in a relatively medium power range, wherein the controller switches on all of the inverter bridges when the power of the inverter power signal falls in a relatively high power range.

* * * * *